(12) United States Patent
Chung (10) Patent No.: US 6,650,245 B2
(45) Date of Patent: Nov. 18, 2003

(54) MULTI-FUNCTIONAL HYBRID CONTACTOR

(75) Inventor: Yong Ho Chung, Ansan (KR)

(73) Assignee: LG Industrial Systems Co., Ltd., Seoul (KR)

( * ) Notice: Subject to any disclaimer, the term of this patent is extended or adjusted under 35 U.S.C. 154(b) by 78 days.

(21) Appl. No.: 10/046,260

(22) Filed: Jan. 16, 2002

(65) Prior Publication Data

US 2002/0093774 A1 Jul. 18, 2002

(30) Foreign Application Priority Data

Jan. 16, 2001 (KR) .......................................... 2001/2406

(51) Int. Cl.⁷ .............................................. G08B 21/00
(52) U.S. Cl. ....................... 340/648; 318/757; 318/778; 340/525; 340/648; 340/657; 340/659; 340/664; 361/2; 361/12
(58) Field of Search ................................ 340/525, 648, 340/657, 659, 664; 361/23–35, 12, 2; 318/445, 727, 778, 757, 763; 218/3, 4, 75–21

(56) References Cited

U.S. PATENT DOCUMENTS 4,356,525 A  * 10/1982 Kornrumpf et al. ........... 361/4
4,360,847 A  * 11/1982 Bloomer et al. ............... 361/3
4,996,469 A  *  2/1991 DeLange et al. ........... 318/757
5,057,962 A  * 10/1991 Alley et al. .................... 361/24

* cited by examiner

Primary Examiner—Daniel J. Wu
Assistant Examiner—Lam Pham
(74) Attorney, Agent, or Firm—Birch, Stewart, Kolasch & Birch, LLP (57) ABSTRACT

A multi-functional hybrid contactor has a motor protection function against an abnormal state in addition to the starting, running and stopping of the motor, the same effect as the case that an electronic motor protection relay (EMPR) is connected in parallel can be obtained with only one multi-functional hybrid contactor. Also, the size of the product is much reduced compared to the case that the electric motor protection relay (EMPR) is connected in parallel, and its cost can be reduced. In addition, since the semiconductor switch is turned on only in the initial stage of starting and stopping, the rated current capacity and size of the semiconductor switch can be considerably reduced compared to the conventional soft starting method in which the semiconductor switch is used for controlling of all of starting, running and stopping.

13 Claims, 8 Drawing Sheets

AC3 CLASS DURABILITY TESTING CONDITION

FIG. 5B
BACKGROUND ART

AC4 CLASS DURABILITY TESTING CONDITION

FIG. 8A $V_{RUN}$

FIG. 8B $V_{SM}$

FIG. 8C $V_{TRIAC}$

MULTI-FUNCTIONAL HYBRID CONTACTOR

BACKGROUND OF THE INVENTION

1. Field of the Invention

The present invention relates to a multi-functional hybrid contactor, and more particularly, to a multi-functional hybrid contactor having a function of an electronic motor protection relay (EMPR) and a function of selectively starting a motor in a direct starting mode or a soft starting mode.

2. Description of the Background Art

In general, a method for starting a motor includes a direct starting method for supplying a power source voltage directly to a motor by using a relay and a relay contact and a soft starting method using a semiconductor switch device.

The direct starting method has a problem that, since the power source voltage is directly supplied to the motor, much surge current is caused on power supplying to damage a motor and a contact of a contactor is also damaged.

Figure 1:
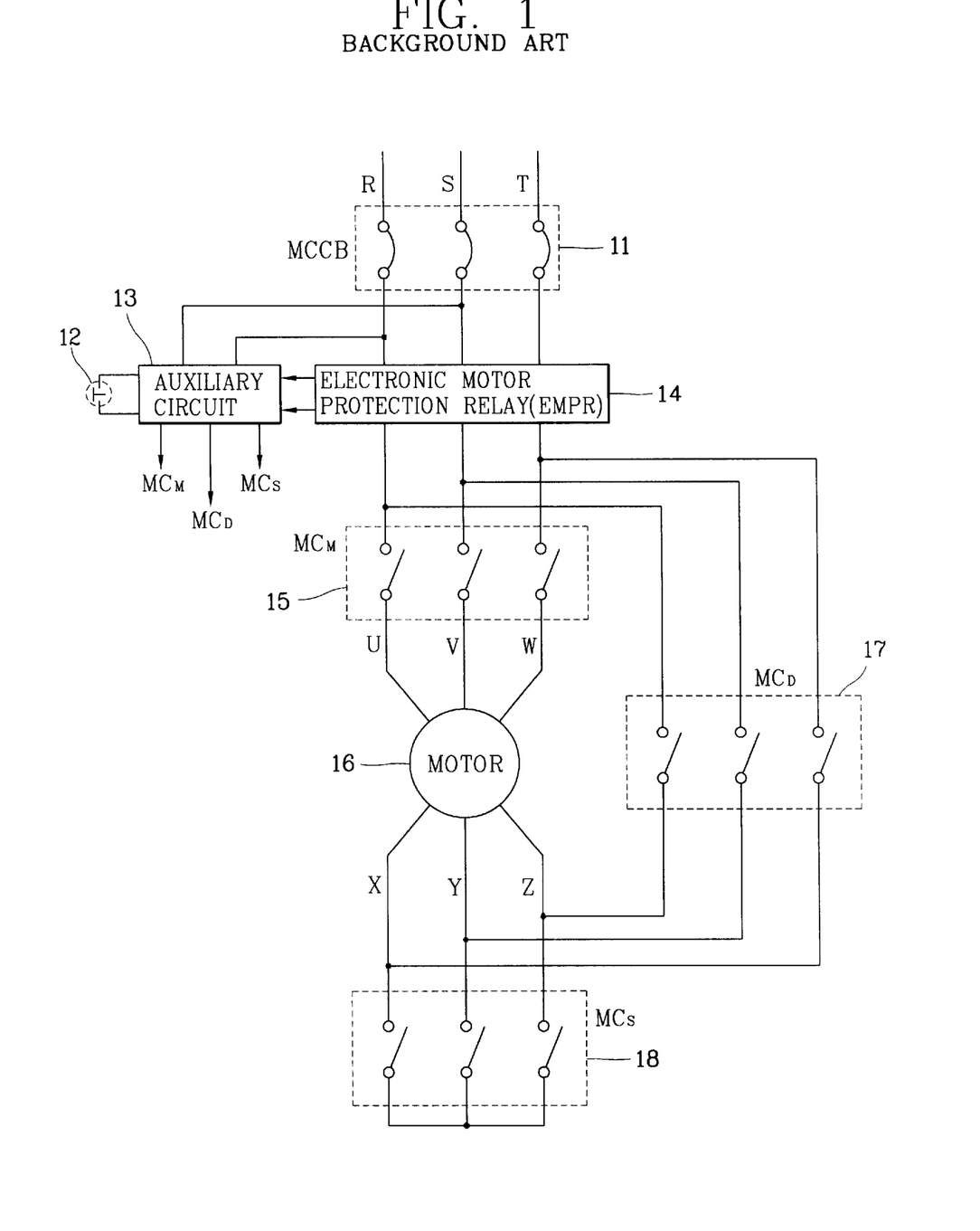
FIG. 1 is a view showing a circuit construction of a star-delta convertible motor control apparatus in accordance with a prior art.

In order to protect the motor against the surge current generated in starting a motor for improving the direct starting method, a method has been proposed in which a motor is started by a so-called 'star connection' in its starting and the star connection is converted into a so-called 'delta connection' to operate the motor in an operation that a stable power source voltage is supplied, as shown in FIG. 1.

FIG. 1 illustrates a motor control apparatus adopting the prior art.

As shown in FIG. 1, a motor control apparatus includes: a circuit breaker (MCCB: Molded case circuit breaker) 11 for conducting or cutting off a source current inputted from a three-phase power source terminal (R, S, T); an electronic motor protection relay (EMPR) 14 for monitoring an inverted phase, a phase deficiency, an unbalance of phases, an overload or an over current during an operation of a motor 16 so as to determine whether there is an error in the source current supplied to the motor 16 and protect the motor 16; a power supply contactor ($MC_M$) 15 for switching-controlling the three-phase current applied to the motor 16 through coils U, V and W of the motor 16 from the electronic motor protection relay 14; and an operation contactor ($MC_D$) 17 for switching-controlling the current applied to the motor 16 through coils X, Y and Z of the motor 16 from the electronic motor protection relay 14; a starting contactor ($MC_S$) 18 being connected to the coils X, Y and Z of the motor 16 and turned on in starting; and an auxiliary circuit 13 being connected to the three contactors 15, 17 and 18 and sequence-controlling ON/OFF of the contactors 15, 17 and 18.

The operation of the motor control apparatus constructed as described above will now be described.

First, in a state that three-phase alternating current (abbreviated AC hereinafter) is being supplied as three contacts of the molded case circuit breaker 11 are closed, when a user presses a starting switch 12 connected to the auxiliary circuit 13 in order to operate the motor 16, the electronic motor protection relay 14 supplies three-phase power current, and at the same time, starts to continuously monitor the current being supplied to a circuit of the motor 16.

At this time, the auxiliary circuit 13 magnetizes a power supplying contactor controlling relay (not shown) and a starting contactor controlling relay (not shown) installed therein to close the power supplying contactor and the starting contactor 18, and accordingly, the motor 16 assumes a so-called 'star connection' (i.e., 'Y connection') configuration and starts rotating.

Subsequently, when a predetermined time elapses after the motor 16 is started, the auxiliary circuit stops the magnetization of the starting contactor controlling relay to open (OFF) the starting contactor 18 and magnetize an operating contactor controlling relay to close the operation contactor 17.

Then, as the connection configuration of the motor 16 is changed to a so-called 'delta connection', a rated voltage is supplied to the motor 16.

Meanwhile, when the motor 16 starts rotating and a current flows, the electronic motor 16 protection relay 14 continuously measures the current flowing to the motor in order to determine whether there occurs an error in the power current.

If an error is detected from the power current, a cut-off signal is transmitted from the motor protection relay 14, passing the auxiliary circuit 13, to the power supplying contactor 15, so that the power supply contactor 15 is opened to cut off the power being supplied to the motor 16.

However, though the conventional motor control apparatus having the so-called star/delta connection' configuration converting method advantageously reduces the surge current, it fails to have a complete soft starting characteristic. In addition, in order to reduce the surge current, three contactors, one timer for switching starting and operating and three contactor controlling relay are required only to complicate its structure and enlarge its volume.

Moreover, in case that the motor is frequently opened and closed, the contact of the contactor and the motor may be damaged due to an arc generated at the contact of the contactor.

Furthermore, the conventional motor control apparatus can not be applied to a motor which has no function of converting to the 'star-delta connection'.

That is, in general, in case of a motor having a rated voltage of 3-phase 380V or 440V, if a rated voltage is 220V, the motor is operated in a delta connection configuration, while if a rated voltage is 380V or 440V, the motor is operated in a star connection configuration.

Accordingly, in case that a rated voltage of the motor is 220V, the star-delta soft starting method can be adopted. But, in case that a rated voltage is 380V or 440V, since the 'star connection' itself is a condition for applying a rated voltage to the coil of a motor, an appropriate motor needs to be specially manufactured in order to apply the star-delta connection method.

As one solution to the problems, a solid-state switched soft starter (SSSS) method for controlling a level of a voltage applied to a motor or a variable voltage variable frequency (VVVF) method for converting a voltage by a frequency is used.

However, such equipment is more expensive compared to the apparatus operated in a star-delta connection method, and there are difficulties in its application.

In addition, as for the SSSS constructed with only semiconductor switches, during current conducting, heat is generated due to a loss at the both ends of a switch and thus a large heat sink is required to cool the heat, resulting in an increased size of the motor control apparatus.

Figure 2:
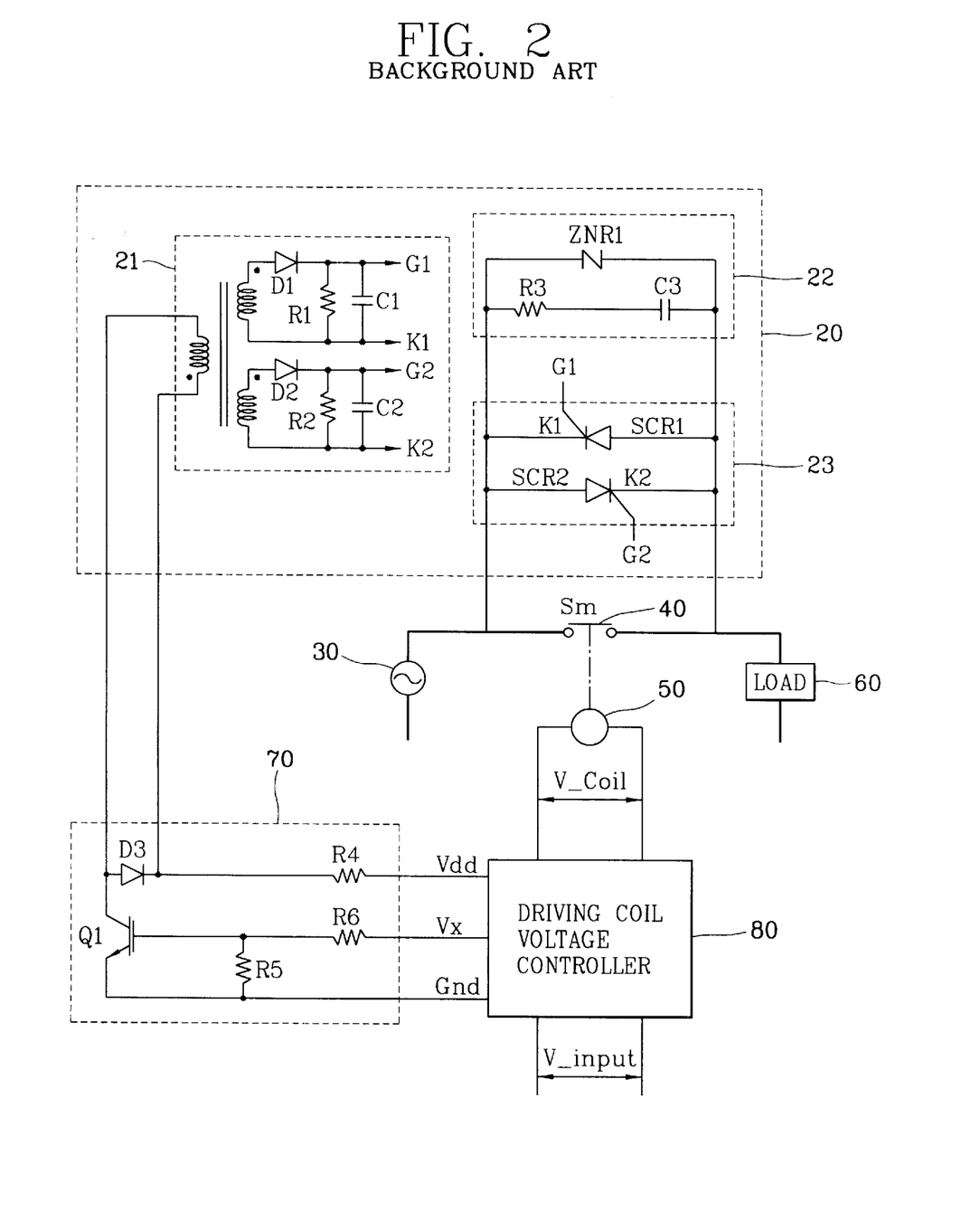
FIG. 2 is a block diagram of a hybrid contactor in accordance with the prior art.

FIG. 2 is a schematic block diagram of a hybrid contactor in accordance with the prior art.

As shown in FIG. 2, a soft starting type motor control apparatus using a hybrid contactor to prevent an arc current generated at the instant when a mechanical relay contact is turned off, including: a main contact 40 of a contactor connected between an AC power source 30 and a load (motor) 60; a relay 50 for controlling switching of the main contact 40 of the contactor; a switch unit 23 having silicon controlled rectifiers (SCR1 and SCR2), that is, semiconductor switching devices, connected in parallel in an inverse direction at the main contact 40 and turned on at a time just before and at a time just after the main contact 40 is closed in order to supply a load current; a snubber 22 for restricting a spike voltage generated at both ends of the switch unit to be below a predetermined value; a driving coil voltage controller 80 for outputting a coil driving voltage (V__coil) to the relay 50, detecting a level change of an input driving voltage (V-input), and outputting a gate driving pulse stream (Vx); and gate driving units 21 and 70 being driven by the gate driving pulse stream (Vx) and supplying a drive signal to the switching unit.

The snubber 22 includes a resistance R3, a condenser C3 and a varistor (ZNR1) restraining an over current.

Figure 3:
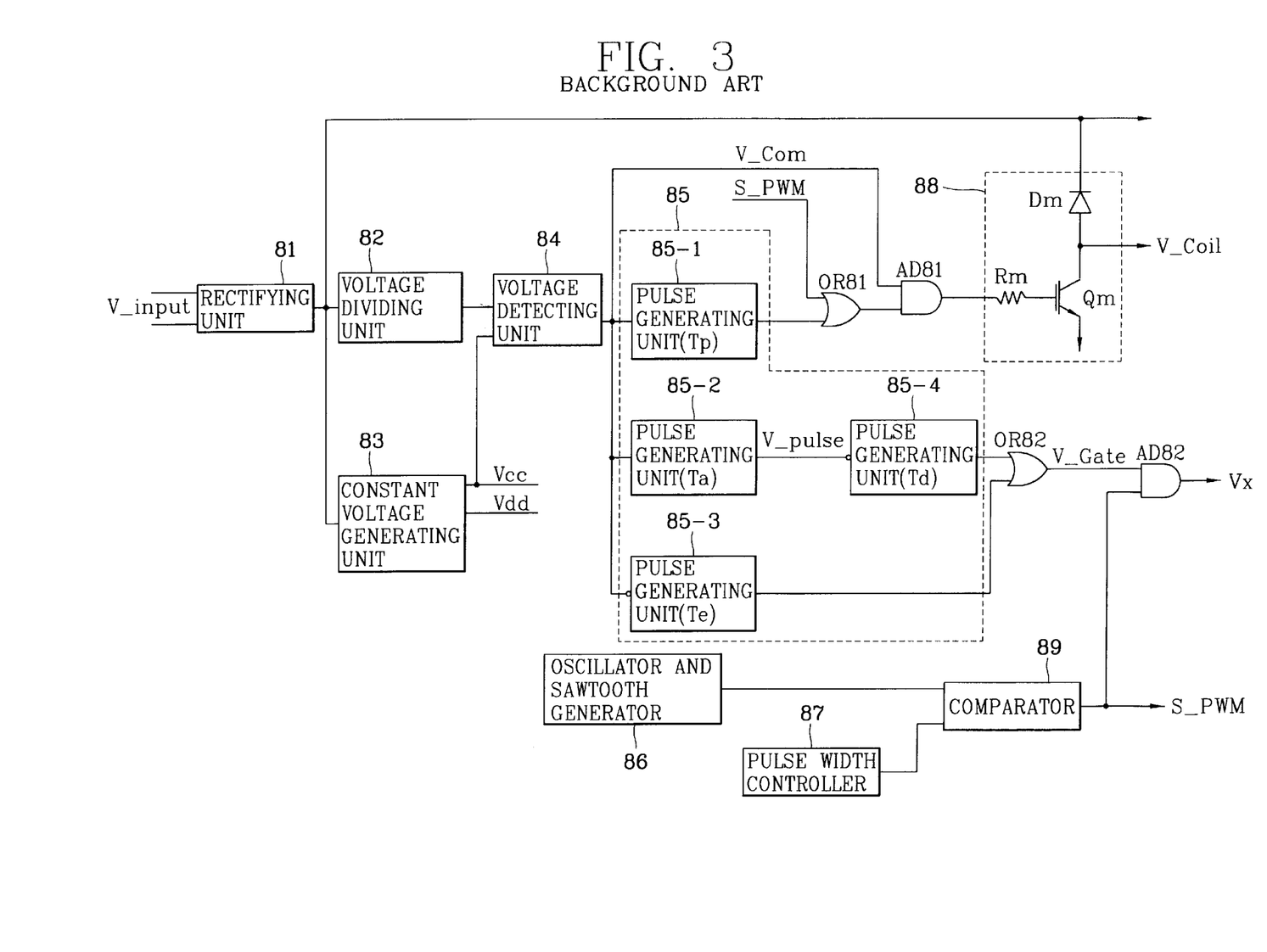
FIG. 3 is a detailed block diagram of a drive coil voltage controller of FIG. 2 in accordance with the prior art.

FIG. 3 is a detailed block diagram of the driving coil voltage controller of FIG. 2.

As shown in FIG. 3, the driving coil voltage controller includes: a rectifying circuit 81 for converting an AC input voltage (V__input) to a direct current and outputting the direct current so that no matter what type of AC or DC a driving coil driving voltage inputted from an external source is applied thereto; a constant voltage generating circuit 83 for receiving a DC voltage from the rectifying circuit 81 and generating a control voltage (Vcc) and a drive voltage (Vdd); a voltage dividing circuit 82 for dividing the DC voltage inputted from the rectifying circuit 81 to a predetermined level; a voltage detecting circuit 84 for generating a high level signal if voltages inputted from the voltage dividing circuit 82 and the constant voltage generating circuit 83 are higher than a predetermined value, and generating a low level signal if voltages inputted from the voltage dividing circuit 82 and the constant voltage generating circuit 83 are lower than a predetermined value; a pulse generating circuit 85 for generating short pulses (Tp, Ta, Te and Td) by a signal outputted from the voltage detecting circuit 84; a pulse width controller 87 for determining a DC value so that an optimum coil drive voltage (V__coil) can be shown according to the size of the driving input voltage (V__input), an operation temperature, and an amount of current passing through the driving coil; an oscillator and triangle wave generator 86 for generating a triangle wave signal according to an inputted voltage; and a comparator for generating a pulse width modulation wave form (S__PWM) signal by a signal inputted from the pulse width controller 87 and the oscillator and triangle wave generator 86.

The operation of the hybrid contactor constructed as described above will now be explained with reference to FIG. 4.

FIG. 4 is a drawing showing wave forms according to operations of FIGS. 2 and 3.

First, when the input voltage (V__input) is applied to the driving coil voltage controller 80 at an arbitrary time point t0, the rectifying circuit 81 of the driving coil voltage controller 80 rectifies the input voltage to a DC voltage and outputs the DC voltage to the voltage dividing circuit 82 and the constant voltage generating circuit 83.

The voltage dividing circuit 82 divides the inputted DC voltage to a certain level, and the constant voltage generating circuit 83 generates a control voltage (Vcc) and a drive voltage (Vdd) using the inputted DC voltage.

The voltage detecting circuit 84 detects a level change of the input driving voltage (V__input) on the basis of the output voltage of the voltage dividing circuit 82 and the output voltage (Vcc) of the constant voltage generating circuit 83, and outputs a high level detect signal (V__com) if the input drive voltage (V__input) increases above a predetermined level, and outputs a low level detect signal if the input drive voltage decreases below a predetermined level.

Figure 4A:
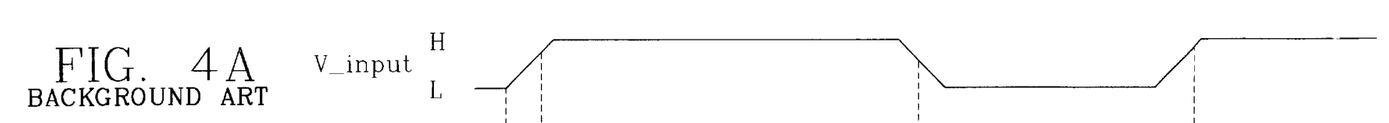
FIGS. 4A through 4I are views showing waveforms according to operations of FIGS. 2 and 3 in accordance with the prior art.
Figures 4B, 4C, 4D:
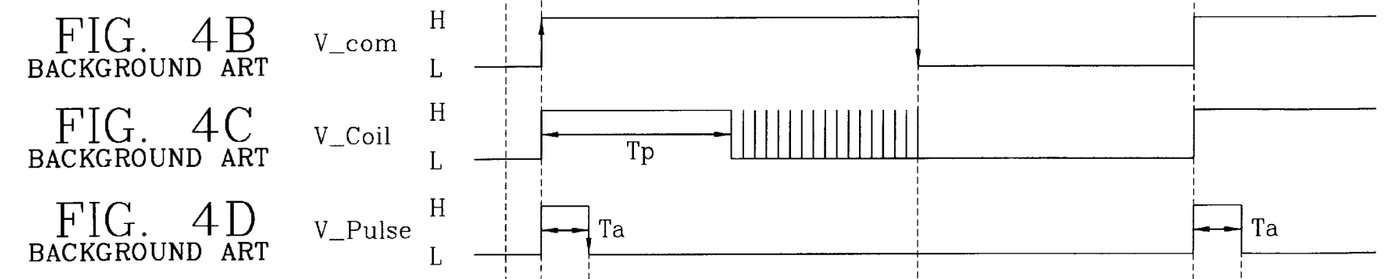

That is, as shown in FIG. 4B, the level detect signal (V__com) of the voltage detecting circuit 84 is changed from a low level to a high level at a time point (t1) upon the lapse of a certain time.

When the level detect signal (V__com) outputted from the voltage detecting circuit 84 is inputted to the pulse generating circuit 85, a first pulse generator 85-1 of the pulse generating circuit 85 generates a pulse having a pulse width of Tp to generate a coil drive voltage (V__Coil) (as shown in FIG. 4C), while a second pulse generator 85-2 generates a one-period pulse (V__pulse) having a pulse width of Ta (as shown in FIG. 4D).

Subsequently, for the time interval [t1–t2], the main contact 40 of the contactor is not closed and it is in a state that an operable contact part is being closed.

Figures 4E, 4F:
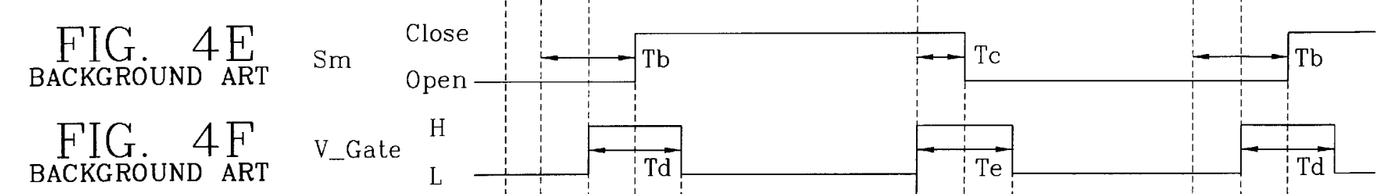

In general, in order to close the main contact 40 of the contactor, time of about Tb (20~50 ms) as shown in FIG. 4E is required, for which, thus, the driving coil voltage controller 80 may output the coil drive voltage (V__coil) to the relay 50 and supply a drive signal to gates G1 and G2 of the SCR1 and SCR2 of the switching circuit 23. At this time, Ta becomes '0' and a pulse generating circuit is not necessary.

However, in order to minimize the amount of heat from SCR1 and SCR2, a pulse generator 85-4 delays a turn-on operation of the SCR1 and SCR2 for a certain time (Ta= about 2 ms), and generates a pulse having a pulse width of Td as shown in FIG. 4F at an instant when its own output pulse (V__pulse) is changed from a high level to a low level.

The pulse outputted from the pulse generator passes an OR gate (OR82) and is inputted to an AND gate AD82. Then, the AND gate AD82 ANDs the ORed pulse and a pulse width modulation signal (S__Pwm) of a comparator 89, and outputs a gate drive pulse stream (Vx) (refer to FIG. 4G).

A gate driving circuit 70 is driven by the gate drive pulse stream (Vx) outputted from the AND gate AD82, and the SCR1 and SCR2 are turned on by the drive signals of the gate (G1 and G2) generated from the gate driving circuit 70.

Figures 4G, 4H:
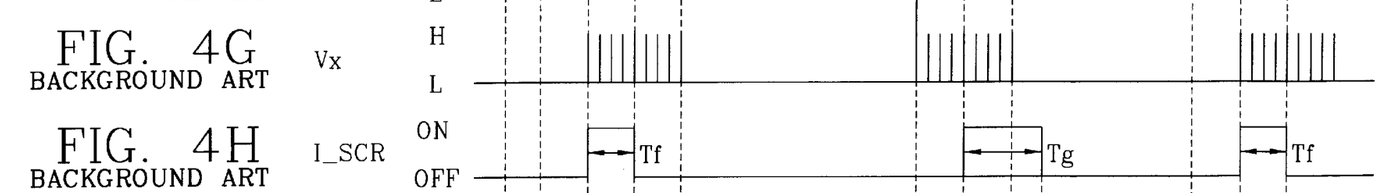

For example, when the main contact 40 is closed at a time point t3, the SCR1 and SCR2 are turned on at a time point t2, so that a current is supplied to the load 60 through the SCR1 and SCR2 as shown in FIG. 4H. And at an instant when the main contact 40 is open, the both end voltage of the SCR1 and SCR2 becomes zero and the SCR1 and SCR2 are turned off.

Even if the main contact 40 of the contactor is not completely closed at the time point t3 and a chattering occurs, as shown in FIG. 4G, since the SCR1 and SCR2 are repeatedly turned on and off by the gate drive pulse stream (Vx) supplied to the gates G1 and G2 of the SCR1 and SCR2 connected in parallel to the main contact 40 up to an arbitrary time point t4, so that an arc current is consumed by the SCR1 and SCR2 at the main contact 40 of the contactor.

By the above described process, if a high voltage is continuously supplied to the drive coil 50 even after completion of the turn-on operation of the contactor, the drive coil 50 may be damaged or a strong residual magnet component may be caused. Thus, a coil drive voltage (V_coil) having a pulse width in a modulated form as shown in FIG. 4C is supplied.

At this time, the pulse width is sufficient even if it is short, e.g., having a width of only a few microseconds, and in this respect, in order to reduce an audible noise, it is necessary to use a frequency of about 20 kHz.

For this purpose, the comparator 89 compares the output pulse of the oscillator and triangle wave generator 86 and the output pulse of the pulse width controller 87 to generate a pulse width modulation signal (S_PWM) and supplies the pulse width modulation signal (S_PWM) to one input terminal of the AND gate AD81.

Accordingly, as shown in FIGS. 4B and 4C, the requested pulse stream can be supplied through a coil driving circuit 88 for an interval where the detect voltage (V_com) of the voltage detecting circuit 84 is high.

Meanwhile, when the input drive voltage (V_input) starts to be changed from a high level to a low level, a level detect signal (V_Com) of the voltage detecting circuit 84 is changed from a high level to a low level at an arbitrary time point t5 (as shown in FIG. 4B).

At this time, the pulse generator 85-3 generates a pulse having a pulse width of Te (as shown in FIG. 4F). The pulse passes the OR gate 82, and then, the AND gate AD82 ANDs it with the output signal of the comparator 89 and generates a gate driving pulse stream (Vx) (as shown in FIG. 4G).

When the gate driving pulse stream (Vx) is inputted to the gate driving circuit 70, the gate driving circuit 21 generates gate (G1, G2) drive signals of the SCR1 and SCR2.

However, the main contact 40 is not opened at the same time when the gate drive signal is generated and a certain delay time (Tc) is taken. Thus, the SCR1 and SCR2 are maintained in an OFF state at the corresponding delay time interval (t5~t6), and at the instant when the main contact 40 is opened, the load current is supplied.

Thereafter, when the gate (G1, G2) drive signals of the SCR1 and SCR2 are cut off at a time point t7, the SCR1 and SCR2 are maintained in an ON state until a polarity of the current flowing to them is inverted, and turned off at a time point t8.

At this time, a spike voltage generated at both ends of the SCR1 and SCR2 is restrained to below a certain value by the snubber 22.

Figure 4I:
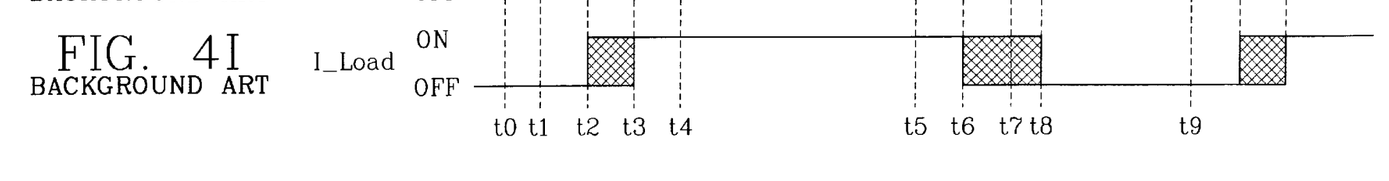

FIG. 4I shows a conduct interval of a current finally supplied to the load 60, in which the conduct interval is from the time point t2 when the SCR1 and SCR2 are turned on to the time point t8 when the SCR1 and SCR2 are turned off.

FIG. 4H shows intervals of a current flowing to the SCR1 and SCR2 when the hybrid contactor is turned on and turned off over one time.

In order to minimize a heat amount at the SCR1 and SCR2, the length of the interval Tf and Tg should be designed to be minimum.

However, in case of adopting the above described hybrid contactor to the direct starting of the motor, the amount of current divided by the semiconductor switch (SCR) connected in parallel to the mechanical relay contact differs depending on the type of a load.

That is, since the semiconductor switch connected in parallel is first turned on before the mechanical contact is closed, when a load with a large surge current initially charged by the semiconductor switch, that is, a current of 6~10 times the rated current in the same condition as the direct starting of the motor, flows to the motor.

This will now be described with reference to FIGS. 5A and 5B.

Figure 5A:
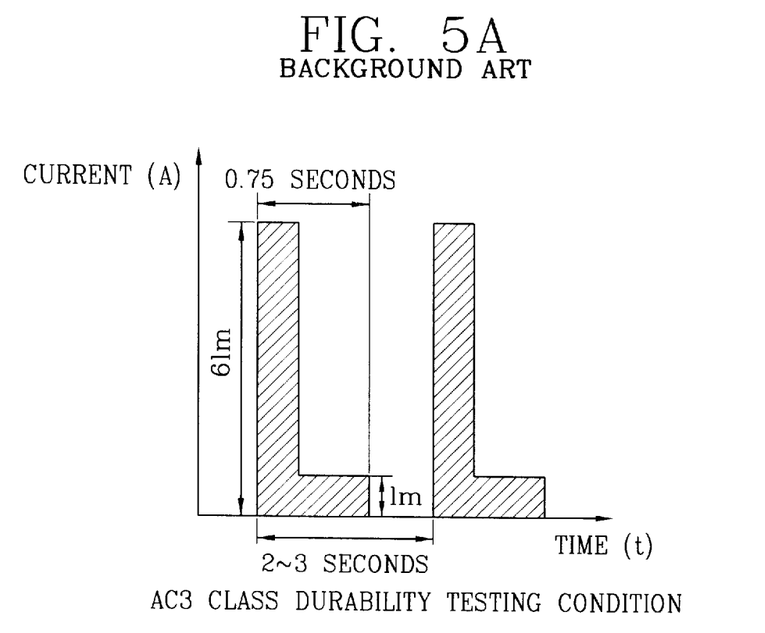
FIGS. 5A and 5B show load patterns of an AC motor of an hybrid contactor in accordance with the prior art.
Figure 5B:
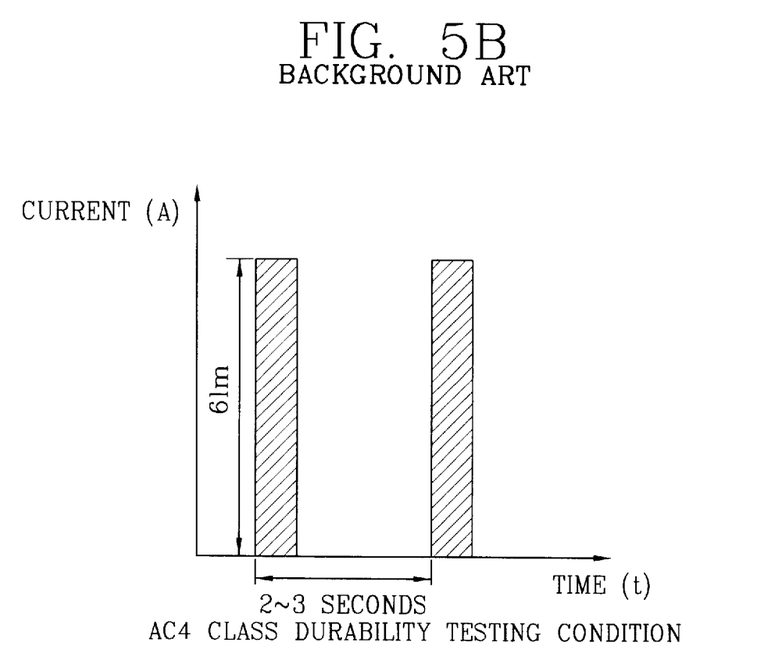

FIGS. 5A and 5B show a load pattern of the motor of the hybrid contactor in accordance with the prior art. FIG. 5A shows a so-called 'AC3 class' durability test condition and FIG. 5B shows a so-called 'AC 4 class' durability test condition that a current of 6~10 times the rated current flows.

Accordingly, the SCR1 and SCR2 should charge the surge current flowing for the time interval t2~t3.

Since the length of the interval has a relation to a switching speed of the mechanical contact, it is not constant and is controlled with a considerable design margin.

Typically, it is controlled for 2~3 periods of 60 Hz, and a capacity of a requested semiconductor switching device is determined according to the length of the interval and an amount of the surge current.

In general, in case of a solid state controller, it allows the surge current of 10 times to flow for 0.5 seconds (about 60 Hz 3 periods), which requires a high-priced semiconductor switching device having a rated current capacity larger as much as 2~3 times of the rated current capacity, and thus a product cost Is increased.

SUMMARY OF THE INVENTION

Therefore, an object of the present invention is to provide a multi-functional hybrid contactor that is capable of selectively starting an AC motor in a direct starting mode or a soft starting mode.

Another object of the present invention is to provide a multi-functional hybrid contactor that is capable of absorbing a surge current and restraining an arc generation at an initial stage of starting in a direct starting mode.

Still another object of the present invention is to provide a multi-functional hybrid contactor that is capable of reducing a capacity and a size of a semiconductor switch by supplying a current to drive an AC motor through a mechanical relay contact in starting and running and supplying a current to drive the AC motor through a semiconductor switch only on starting and stopping.

Yet another object of the present invention is to provide a multi-functional hybrid contactor that is capable of protecting a motor when an abnormal current such as an over current, a phase inversion, an phase deficiency or an unbalance of phases occurs besides a run/stop control and capable of display and/or warning such an abnormal current occurrence state.

To achieve these and other advantages and in accordance with the purpose of the present invention, as embodied and broadly described herein, there is provided a multi-functional contactor including: a detecting means for detecting each phase current supplied from an AC power source to an AC motor; a relay contact being installed between the AC power source and the AC motor and being able to be switched to an opened position or a closed position to supply or cut off a power from the AC power source to the AC motor; a relay for controlling switching of the relay contact; a starting mode selection switch means for selectively starting the AC motor in a direct starting mode or a soft starting mode; a semiconductor switch means being connected in parallel to the relay contact, consuming an arc current due to a chattering of the relay contact by closing for a predetermined time after switching to the closed position of the relay contact if the selection switch means is selected in a direct starting mode, and soft-starting the AC motor by turning on and off for a predetermined time before the relay contact is closed, if the selection switch means is selected in a soft-starting mode; a display means for displaying a running state of the AC motor and/or an abnormal state of an AC current supplied to the AC motor; a setting means for setting a rated current, setting a delay time for neglecting an over current during a predetermined time when the AC motor is directly started, and setting a starting time when the AC motor is soft-started; a run/stop switch means for selectively running and stopping the AC motor; a controller being connected to the current detecting means, the relay, the relay contact, the selection switch means, the semiconductor switch means, the display means, the run/stop switch means and the setting means, so as to control the relay, the semiconductor switch means and the display means depending on the run or stop selection of the run/stop switch means, the detect current from the current detecting means and the set mode of the selection switch means; and a means for warning an abnormal state in its occurrence.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A multi-functional hybrid contactor in accordance with a preferred embodiment of the present invention will now be described in detail with reference to the accompanying drawings.

Figure 6:
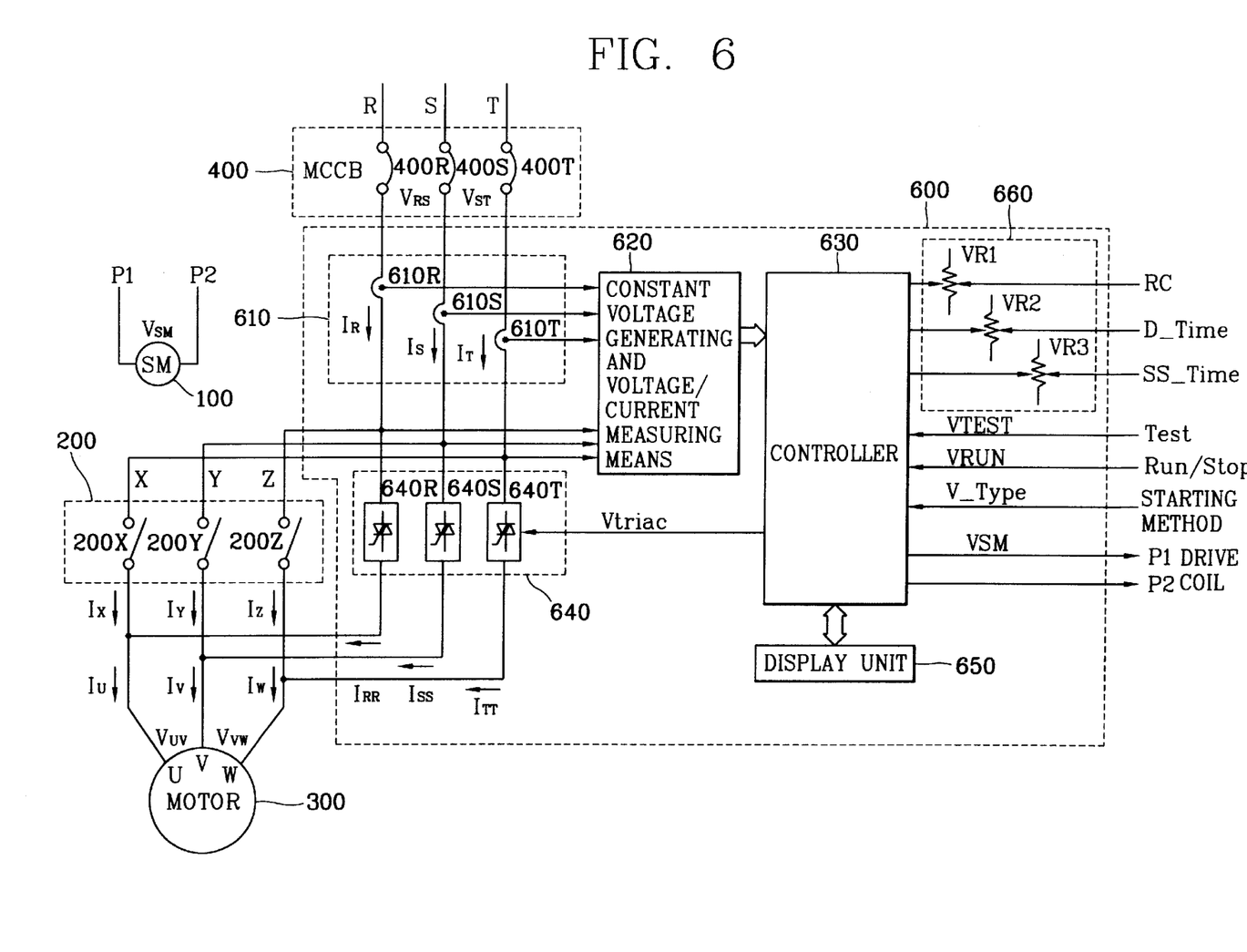
FIG. 6 is a block diagram showing a multi-functional hybrid contactor in accordance with a preferred embodiment of the present invention.

FIG. 6 is a block diagram showing a multi-functional hybrid contactor in accordance with a preferred embodiment of the present invention.

A multi-functional hybrid contactor 600 in accordance with this invention is a apparatus for controlling starting, running or stopping of an AC motor 300 and the hybrid contactor 600 can be used together with a circuit breaker 400 for being connected in serial to 3 phase power source lines (R, S, T) and breaking a circuit when an over current or an electric leakage occurs on a circuit between the AC power source and the AC motor 300; a relay 100 for controlling driving of the AC motor 300; and a relay contact 200 for being switch-controlled to a closed position or an opened position by the relay 100.

The relay 100 is magnetized by a control signal outputted from the hybrid contactor 600 and includes input terminals P1 and P2 to receive the control signal outputted from the hybrid contactor 600.

The relay contact 200 is installed between the AC power source and the AC motor 300, and can be switched to the opened position or the closed position depending upon the magnetization of the relay 100 in order to supply or break the electric power from said AC power source to the AC motor 300. Each numeral 200X to 200Z represents the contact for each phase. Each character X, Y, Z represents a circuit line for connecting the contacts 200X–200Z to a constant voltage generating and voltage/current measuring means 620.

The AC motor 300 may be a two phase AC motor, a three phase AC motor or a multi-phase AC motor and one embodiment of the three phase AC motor is shown on FIG. 6.

The circuit breaker 400 includes switching mechanisms (400R, 400S, 400T) corresponding with each phase for switching each phase circuit to an ON position closing the circuit and each phase circuit to an OFF or a trip position that breaks the circuit.

The hybrid contactor 600 includes a current detecting means 610 for detecting each phase current supplied from the AC power source to the AC motor 300, having three current transformers (CTs) 610R, 610S and 610T corresponding to each phase, and being installed at a circuit line connected between the circuit breaker 400 and the AC motor 300.

The constant voltage generating and voltage/current measuring unit 620 may be divided into a constant voltage generating means and a voltage/current measuring means.

The constant voltage generating means includes a constant voltage generating circuit having an AC-to-DC rectifier for rectifying a 220 V, 60 Hertz 3 phase AC to a DC and a transformer for down-transforming the DC voltage outputted from the AC-to-DC rectifier to a DC control voltage of 5 V, of which the output is generated as a constant voltage signal Vdd.

The voltage/current measuring means includes a circuit for converting an analog current signal detected from each of the current transformers 610R, 610S and 610T of the current detecting means 610 to a digital current signal that the controller 630 can read so as to measure each phase current supplied to the AC motor 300, and a circuit for operationally amplifying the current signals detected from each of the current transformers 610R, 610S and 610T and outputting them as voltage signals.

Wherein, in order to measure each phase voltage supplied to the AC motor, besides the method for operationally amplifying the detected phase current and obtaining the voltage signal as described above, a potential transformer (so called abbreviated PT) may be installed at the three phase power source lines R, S and T to directly obtain a voltage signal.

The current transformers 610R, 610S and 610T and the potential transformer may be internally installed in the multi-functional hybrid contactor or may be installed outside the multi-functional hybrid contactor.

That is, when the multi-functional hybrid contactor of the present invention is manufactured for sale, the current transformers 610R, 610S and 610T and the potential transformer may be manufactured and sold separately from the hybrid contactor, and also may be used by being connected to the multi-functional hybrid contactor as intended.

The inputs of constant voltage generating and voltage/current measuring means 620 are connected with the current transformers 610R, 610S and 610T, the three phase power source lines R, S and T and the relay contacts 200X, 200Y and 200Z, and outputs of the measuring means 620 are connected with the controller 630.

The controller 630 is a means for controlling the relay 100, the semiconductor switch unit 640 and the display unit 650 and may be constructed as a microprocessor including a central processing unit (CPU), a random access memory (RAM) and a read only memory (ROM) and may be constructed as one chip.

The inputs of controller 630 are connected with the measuring unit 620, the setting unit 660, the test port Test, the run/stop switch and the starting mode selecting means, and outputs of controller 630 are connected with the relay 100, the display unit 650 and the semiconductor switch means 640.

The semiconductor switch means 640 is connected in parallel to the relay contacts 200X, 200Y and 200Z on the power source lines R, S and T between the circuit breaker 400 and the AC motor 300, so that when the selection switch means is selected in a direct starting mode, the semiconductor switch means 640 consumes an arc current due to the chattering of the relay contacts 200X, 200Y and 200Z by closing for a predetermined time after switching the relay contacts 200X, 200Y and 200Z to a closed position, and when the selection switch means is selected in a soft-starting mode, the semiconductor switch means 640 turns on and off for a predetermined time before the relay contacts 200X, 200Y and 200Z are closed, so as to soft-start the AC motor 300.

As the semiconductor switch unit 640, besides a triac, a Silicon Controlled Rectifier (so called abbreviated SCR), a Gate Turn Off thyristor (so called abbreviated GTO), an Insulated Gate Controlled Tthyristor (so called abbreviated is IGCT), a Reverse Conducting Thyristor (so called abbreviated RCT), an Insulated Gate Bipolar Transistor (so called abbreviated IGBT) may be used.

The display means 650 is a means for displaying a running state of the AC motor and/or an abnormal state of the AC current supplied to the AC motor 300, and may be constructed by one of a Liquid Crystal Display, a Light Emitting Device and a lamp.

When the Liquid Crystal Display (abbreviated as LCD hereinafter) is used as the display means 650, the running state may be displayed as a character of 'RUN' and 'STOP', and the abnormal state may be displayed by one of characters of 'over current', 'phase inversion', 'phase deficiency', 'unbalance of phases'.

In case that the light emitting device (abbreviated as LED hereinafter) is to be used as the display means 650, after all or at least one of 'over current', 'phase inversion', 'phase deficiency', 'unbalance of phases' are marked or is marked on a front cover of the hybrid contactor of the present invention, the LED is installed for displaying at a position near the marking portion.

In case that the lamp is to be used as the display unit 650, the lamp is turned on in response to a control signal from the controller 630 when one of the above described abnormal states occurs.

The setting means 660 includes a variable resistor VR1 for setting a rated current value of a current supplied to the AC motor 300; a variable resistor (VR2) for setting a delay time for neglecting an over current for a predetermined time in direct-starting the AC motor 300; and a variable resistor (VR3) for setting a starting time in soft-starting the AC motor 300.

The setting means 660 may include a means for setting a tolerable difference rate of a root mean square value of each phase current or phase voltage in order to detect the unbalance of phases, and the means may be constructed as a variable resistor or a key switch for generating a signal corresponding to the difference rate.

The test port is a means for testing the relay contact 200 by magnetizing the relay 100 according to the control signal outputted from the controller 630. In a state that the circuit breaker 400 is in an OFF state, an external DC power source is connected to the test port and supplies a test voltage (VTEST) to the controller 630, the controller 630 outputs a control signal to the relay 100 so as to close the relay contact 200. By doing that, based on the sound generated when closing the relay contact 200, the operation failure of the hybrid contactor according to the present invention can be tested.

The run/stop switch, manipulated by a user to drive or stop the motor, can be constructed as a push button switch or a toggle switch.

When the user manipulates the run/stop switch to a run position, a corresponding position select signal is transmitted to the controller 630. Then, in response to the position select signal, the controller 630 transmits a control signal to the relay 100 or the semiconductor switch means 640 for their closing, so that the AC power is supplied to the AC motor 300, and accordingly, the AC motor 300 is driven.

When the user manipulates the run/stop switch to a stop position, a corresponding position select signal is transmitted to the controller 630. Then, in response to the position select signal, the controller 630 transmits the control signal to the relay 100 or the semiconductor switch means 640, so that the relay contact 200 or the semiconductor switch means 640 is switched to the opened position to stop supplying of the AC power to the AC motor 300 and thus the AC motor is stopped.

The position select signal is a voltage signal having a high level or a low level according to ON or OFF of the switch.

The starting mode select switch is used for selection when the user intends to starts the AC motor 300 in a direct starting mode or in a soft starting mode.

Accordingly, when the user selects the starting mode selection switch as a direct starting mode and manipulates the RUN/STOP switch to the RUN position, the AC motor 300 is started in a direct starting mode and is maintained in the RUN state until the user manipulates the RUN/STOP switch to the STOP position.

The operation of the multi-functional hybrid contactor of the present invention will now be described with reference to FIGS. 6 through 8.

Referring to starting of the AC motor according to the multi-functional hybrid contactor in accordance with the present invention, the AC motor is selectively operated in the direct starting mode or the soft starting mode according to the position of the starting mode select switch as selected by the user.

First, in case that the user selects the starting mode select switch as a direct starting mode, the operation of the multi-functional hybrid contactor from starting of the AC motor to stop will now be described with reference to FIGS. 6 and 7A through 7F.

FIGS. 7A through 7F are views showing waveforms of signals of a major part of FIG. 6 when being operated on a direct starting mode in accordance with the preferred embodiment of the present invention.

When the user operates the circuit breaker 400 to an ON position and the contacts 400R, 400S and 400T by phases are closed, a power can be supplied from the AC power source through the circuit breaker 400 to the AC motor 300.

And in this state, the measuring unit 620 rectifies and down-transforms the three phase AC to a DC, and supplies the constant voltage signal Vdd to the controller 630.

Figure 7A:
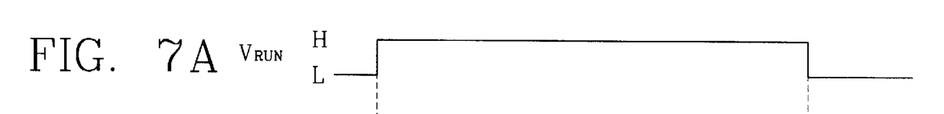
FIGS. 7A through 7F are views showing waveforms of signals of a major part of FIG. 6 when a motor is operated in a direct starting mode in accordance with the preferred embodiment of the present invention.

In this state, when the user manipulates the RUN/STOP switch to the RUN position in order to drive the AC motor 300, as shown in FIG. 7A, the electrical potential of the position select signal (V_Run) is changed from a low level to a high level at this time point t1.

When the controller 630 receives the position select signal (V_Run) having the electrical potential which has been changed to the high level from the run/stop switch, it transmits a drive control signal (V SM) to the relay 100.

Figure 7B:
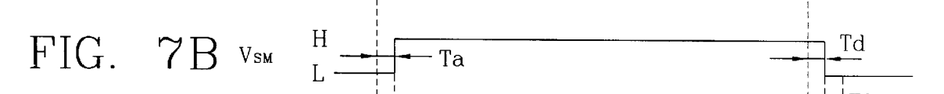

Since the relay 100 is constructed as a coil, it has a delay time as much as Ta as shown in FIG. 7B to reach the drive voltage, that is, to be magnetized and then closes the relay contact 200 at the time point t2.

Figure 7C:
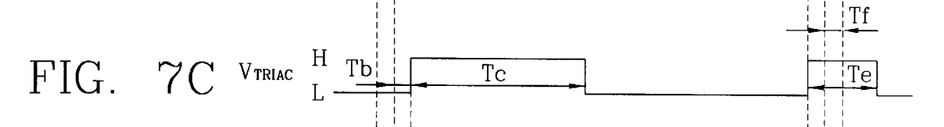
Figure 7D:
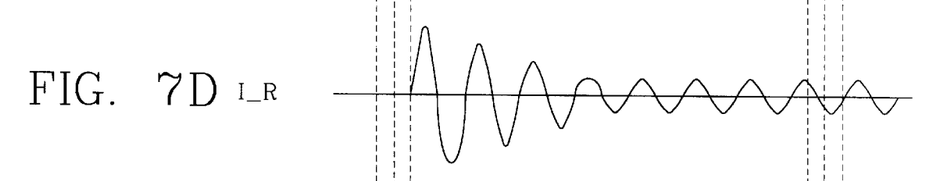
Figure 7E:
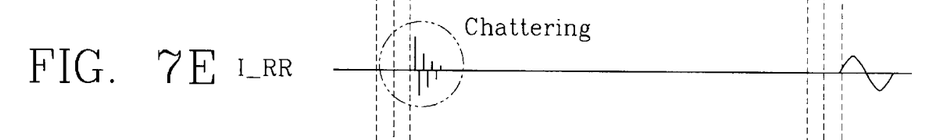
Figure 7F:
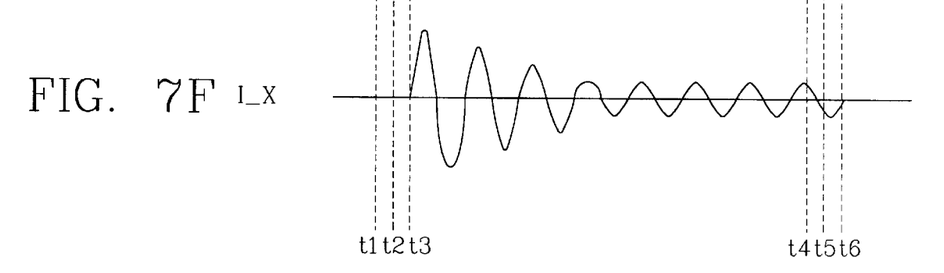

When the mechanical contacts 200X, 200Y, 200Z, that is, the main contact, to supply the AC power to the AC motor 300 by the magnetized relay 100, is closed, instantly, much surge current flows to the load, that is, the AC motor 300 from the power source (refer to FIGS. 7D and 7F).

The surge current is detected by the current detecting means 610 and transmitted to the controller 630 via the measuring means 620.

In starting, even if the value of the surge current is greater than the rated current value set by the variable resistor VR1, the controller 630 neglects the surge current, rather than determining it as an over current, for the delay time set by the variable resistor VR2.

The controller 630 outputs a trigger signal (V_Triac) as a control signal for switching on the semiconductor switch means 640R, 640S and 640T to a closed position at the time point t3.

In order for the controller 630 to detect the surge current, the time as much as Tb is delayed, and accordingly, the surge current is tolerated by the relay contact 200, that is, the mechanical contact, for the delay time Tb.

The mechanical relay contact 200 typically generates a so-called chattering that the contact is repeatedly opened and closed at the initial stage of closing, and at this time, an arc of high voltage is generated to damage other electronic devices and motor as well as the contact.

Accordingly, as shown in FIG. 7C, the hybrid contactor in accordance with the present invention outputs the trigger signal (V_Triac) to the semiconductor switch means 640 only for the chattering occurrence period Tc, so that the arc can be instantly consumed by the semiconductor switch means 640. Therefore, the relay contact 200, the electronic devices and the AC motor 300 are prevented from being damaged by the arc.

The reason why the current I RR flowing through the semiconductor switch means 640 has an intermittent pulse form as shown in FIG. 7E is that the voltage across both ends of the semiconductor switch means 640 becomes zero at an instant when the relay contact 200 is closed in chattering, so that the semiconductor switch means 640 is automatically OFF (opened) regardless of the trigger signal (V_Triac) from the controller 630, and at an instant when the mechanical relay contact 200 is opened upon chattering occurrence, the semiconductor switch unit 640 is turned on again, and this process is repeated.

At this time, since the chattering instant is very short, the total current amount flowing through the semiconductor switches 640R, 640S and 640T during the occurrence of the chattering is neglectfully small. Therefore, the semiconductor switch needs not have a large and big capacity, and thus, the overall size of the hybrid contactor can be compact.

Thereafter, until the user manipulates the RUN/STOP switch to a STOP position, the waveform of a current like the waveform of a rear portion as shown in FIG. 7F is stably supplied to the AC motor 300.

Meanwhile, when the user manipulates the RUN/STOP switch to a STOP position in order to stop the AC motor 300, the electrical potential of the position select signal (V_Run) as shown in FIG. 7A is changed from a high level to a low level at the time point t4.

When the controller 630 receives the position select signal (V_Run) having the electrical potential which has been changed to the low level from the RUN/STOP switch, it stops transmission of the drive control signal (V SM) to the relay 100.

Since the relay 100 is constructed as a coil, it has a delay time as much as Td as shown in FIG. 7B until the drive voltage drops to zero, that is, until the magnetic force is gone, and then opens the relay contact 200 at the time point t5.

As shown in FIG. 7D, even after the electrical potential of the position select signal (V_Run) from the RUN/STOP switch is changed from the high level to the low level at the time point t4, the current IR flowing through the line 'R' of the three phase power source lines flows for about 2 periods.

In addition, likewise, the current Is and IT flowing through the other two lines S and T flows for about two periods.

In order to quickly consume the currents IR, Is and IT and quickly stop the AC motor 300, the controller 630 outputs the trigger signal (V_Triac) to the semiconductor switches 640R, 640S and 640T for a time Te.

Accordingly as shown in FIG. 7E, currents IRR, ISS and ITT are supplied only for about 1 period of 60 Hz through the semiconductor switches 640R, 640S and 640T.

For a time besides the starting and stop interval of the AC motor 300, since the semiconductor switches 640R, 640s and 640T are turned off, no heat is generated from the semiconductor switches 640R, 640S and 640T.

Accordingly, a cooling unit such a large heat sink is not necessary, and thus, the product of the hybrid contactor is low in price and the size of the product can be reduced.

Meanwhile, when the AC motor 300 is being run at a stable voltage after starting, the controller 630 performs a function of detecting an abnormal state of the current, that is, an over current, a phase inversion, a phase deficiency and an unbalance of phases, by using three phase currents IR, Is and IT flowing the motor 300 detected by the current detecting means 610, and indicates the state information of the abnormal state and the RUN/STOP state on the display means 650.

In detail, the controller 630 compares a rated current set by the variable resistor VR1 and the three phase currents which has been detected by the current detecting means 610 and inputted via the voltage/current measuring means 620, and then if the values of the three phase currents are greater than the rated current value, the controller determines that an over current has occurred and outputs an over current occurrence state information to the display means 650 to display it.

Subsequently, the operation for detecting a phase inversion will now be described.

The setting means 660 preferably includes a means (not shown) for setting a phase order of each phase current. The controller 630 stores a phase order, that is, the data in an order of phase 'R' as the first, phase 'S as the second, and phase 'T' as the third, inputted by the means, and compares the order of the detect current inputted through the current transformers 610R, 610S and 610T with the stored order data. If the order of the detect current is not identical to the order data, the controller 630 determines that a phase inversion has occurred and outputs the phase inversion occurrence state information to the display means 650 to indicate it.

The setting means 660 includes a means (not shown) for setting the number of phases in order to detect a phase deficiency. The controller 630 stores the data of the number of phases set by the user by the means, counts the number of detect current signals inputted through the current transformers 610R, 610S and 610T, and compares the count value with the stored set data value. If the count value is not identical to the stored set data value, the controller 630 determines that a phase deficiency has occurred and outputs the phase deficiency occurrence state information to the display means 650 to indicate it.

The setting means 660 includes a means for setting a tolerable difference rate of a root mean square value of each phase current in order to detect an unbalance of phase currents.

The difference rate can be selectively set as 5% or 10% or the like by the setting means 660 by the user, and the controller 630 stores a data of the difference rate set by the user by means of the means and calculates a root mean square value of the detect current signal by phases at an arbitrary time point when the data of the difference rate is inputted through the current transformers 610R, 610S and 610T.

The controller 630 obtains a difference value on the basis of the root mean square value by phases operated. For example, it obtains a difference value by subtracting an S-phase root mean square value from the R-phase root mean square value, obtains a difference value by subtracting a T-phase root mean square value from the S-phase root mean square value, and obtains a difference value by subtracting a R-phase root mean square value from the T-phase root mean square value.

The three difference values are divided by three phase current values and then a percentage for each phase current value is obtained.

The thusly obtained nine difference rate values are compared with the stored difference rate value, and if even one of the detected difference rate values is smaller than the stored difference rate value, the controller 630 determines that an abnormal state of unbalance of phases has occurred, and outputs the state information to the display means 650 to indicate it.

As embodiment of the setting means, a key switch and a liquid crystal display may be used. The liquid crystal display can be commonly used as the display means 650.

After the RUN selection of the RUN/STOP switch, when a predetermined starting time elapses, the controller 630 may perform the abnormal state monitoring operation by, for example, executing a program stored in the ROM.

In addition, in a different embodiment, the phase order, the phase number, the data of allowable rate of the RMS difference values by phases can be contained in the program and stored by a separate program loader, or previously inputted for use according to a user's request when manufacturing the hybrid contactor as an optional specification.

Meanwhile, in case that the user selects the starting mode select switch as a soft starting mode, the operation of the multi-functional hybrid contactor from starting the AC motor to stoppage of the AC motor will now be described with reference to FIGS. 6 to 8A through 8H.

FIGS. 8A through 8H are views showing waveforms of signals of a major part of FIG. 6 when being operated in a soft-starting mode in accordance with the preferred embodiment of the present invention.

When the phase contacts (400R, 400S, 400T) are closed (ON) as the user operates the circuit breaker 400 to an ON position, a power can be supplied from the AC power source to the AC motor 300 through the circuit breaker 400.

And in this state, the constant voltage generating and current/voltage measuring unit 620 rectifies and down-transforms the three-phase AC to a DC and supplies a constant voltage signal Vdd to the controller 630.

In this state, when the user manipulates the RUN/STOP switch to a RUN position in order to drive the AC motor 300, as shown in FIG. 8, an electrical potential of the position select signal (V_Run) is changed from a low level to a high level at the time point t1.

As the controller 630 receives the position select signal (V_Run) having the electrical potential which has been changed to a high level from the RUN/STOP switch, the controller 630 outputs the trigger signal (V_Triac) as a control signal to the semiconductor switch means 640 for turning on and off for a predetermined time before the relay contact 200 is closed in order to soft start the AC motor.

Figure 8A:
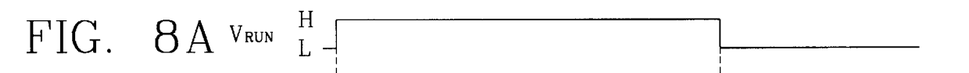
FIGS. 8A through 8H are views showing waveforms of signals of a major part of FIG. 6 when the motor is operated in a soft-starting mode in accordance with the preferred embodiment of the present invention.
Figures 8B, 8C:
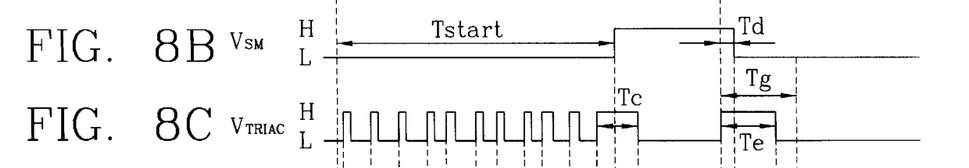
Figure 8D:
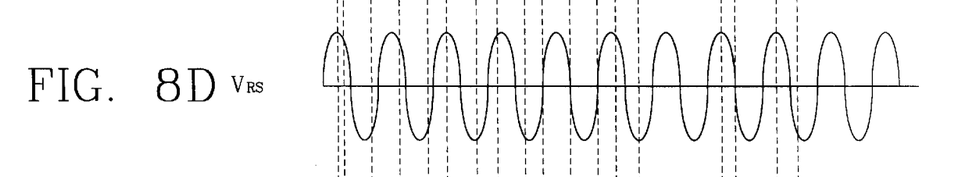
Figure 8E:
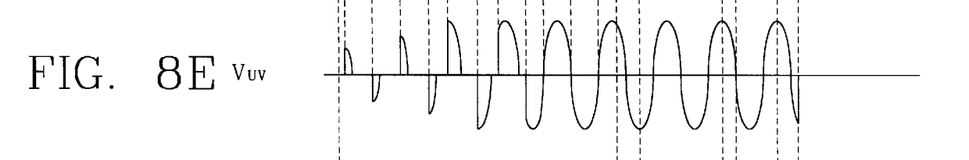

That is, the controller 630 controls the firing angle applied to the semiconductor switches 640R, 640S and 640T as shown in FIGS. 8C and 8E by using the phase information of the inter phase measuring voltages VRS and VST as shown in FIG. 8D inputted through the measuring means 620.

In other words, in outputting a control signal that turns on the semiconductor switch 630 with a phase difference, that is, the trigger signal $V_{TRIAC}$, the controller 630 performs a phase-angle controlling such that the trigger signal is outputted with the inter phase voltage phase angle difference of about 180 degrees (see the initial waveform of FIG. 8E) initially and gradually the inter phase voltage phase angle difference approaches 0 degree (see the middle waveform of FIG. 8E).

Figure 8F:
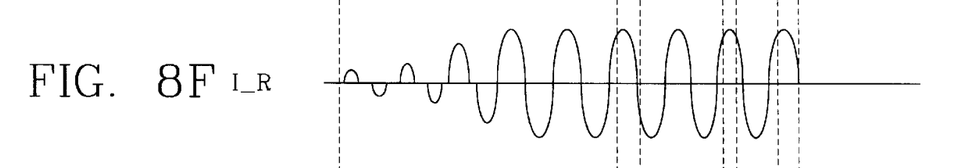

Accordingly, the voltage and current as shown in FIGS. 8E and 8F are supplied to the motor 300. As shown in FIG. 8F, the level of the current supplied to the motor 300 is gradually increased, so that the motor 300 can be smoothly and gradually started without a big surge current at the initial stage.

The starting time of the soft start mode operated as described above is set by using the variable resistor VR3.

When the pre-set starting time ($T_{START}$) elapses, as shown in FIGS. 8B and 8C, the controller 630 supplies the trigger signal (V_Triac) over the TC interval to the semiconductor switches 640R, 640S and 640T) before closing the mechanical contacts 200X, 200Y and 200Z at the time point t2, so as to consume an arc current generated at the mechanical relay contacts 200X, 200Y and 200z.

The controller 630 closes the mechanical relay contacts 200X, 200Y and 200Z by outputting the control signal to the input terminals P1 and P2 of the relay 100 at the time point t2 and magnetizing the relay 100.

Figure 8G:
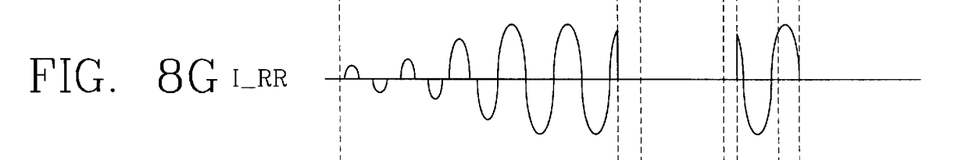

After the relay contacts 200X, 200Y, 200Z are closed, the voltages across the both ends of the semiconductor switches 640R, 640S and 640T become zero, so that the semiconductor switches 640R, 640S and 640T are automatically turned off, and accordingly, there is no output current from the semiconductor switch unit 640 from the time point t2 to t5 as shown in FIG. 8G.

Figure 8H:
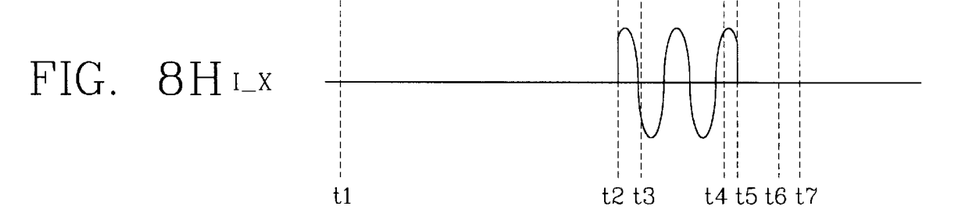

As the relay contact 200 is closed for the time from the time point t2 to the time point t5, the load currents Ix, Iy and Iz as shown in FIG. 8H flow to the AC motor 300 through the relay contact 200.

Meanwhile, as an assumption, a case that the user manipulates the RUN/STOP switch means to stop the motor 300 which has started in a soft starting mode at the time point t4 will now be described.

When the user switches the RUN/STOP switch means to the STP position at the time point t4 in order to stop the AC motor 300, the position select signal (V_Run) is changed from a high level to a low level and the controller 630 detects it and supplies a trigger signal (V_Triac) to the semiconductor switches 640R, 640S and 640Z for a time T3 at the time point t4, and at the same time, stops transmission of the control signal to the relay 100.

Then, after the delay time Td, as shown in FIG. 8B, for which the magnetic force of the relay 100 is gone, the mechanical contacts 200X, 200Y and 200Z are opened, and the semiconductor switches 640R, 640S and 640T are turned on at the time point t5 when the contacts 200X, 200Y and 200Z are opened as shown in FIG. 8G, and supplies the load currents IRR, ISS and ITT only for a half to one period of 60 Hz until turning off at the time point t6.

Thus, when the semiconductor switches 640R, 640S and 640T are turned off at the time point t6, the AC motor 300 is stopped.

Meanwhile, when the motor 300 is in a RUN state after passing the starting time, the controller 630 performs detecting of over current, phase inversion, phase deficiency and unbalance of phases.

On the basis of the three phase currents IR, Is and IT inputted from the measuring means 620 at the interval t2~t4, and if such an abnormal state occurs, the controller 630 outputs corresponding state information to the display means 650 to display it.

In the above descriptions, the triac is taken as an example of the semiconductor switches 640R, 640S and 640T connected in parallel to the contacts 200X, 200Y and 200Z of the contactor. Nonetheless, any one of semiconductor device among various types of SCR, GTO, IGCT, RCT or IGBT may be used to obtain the same effect.

Also, in the above descriptions, the three contacts 200X, 200Y and 200Z of the three contacts are taken as an example, but the above-described method is adopted in the same manner to two phases having two contacts or a multi-phase having more than three contacts.

In addition, in the above descriptions, the current transformer is mounted inside the multi-functional hybrid contactor 600, but the same effect can be obtained even if the current transformer is mounted outside a product.

As so far described, the multi-functional hybrid contactor of the present invention has many advantages.

That is, for example, since the multi-functional hybrid contactor has a motor protection function against an abnormal state in addition to the starting, running and stopping of the motor, the same effect as the case that an electronic motor protection relay (EMPR) is connected in parallel can be obtained with only one multi-functional hybrid contactor.

Also, the size of the product is much reduced compared to the case that the electric motor protection relay (EMPR) is connected in parallel, and its cost can be reduced.

In addition, since the semiconductor switch is turned on only in the initial stage of starting and stopping, the rated current capacity and size of the semiconductor switch can be considerably reduced compared to the conventional soft starting method in which the semiconductor switch is used for controlling of all of starting, running and stopping.

Moreover, since the motor starting is controlled by jointly using the contacts of the semiconductor switch and the mechanical relay, a protection performance against the surge current and chattering is excellent compared to the conventional direct starting method only by the mechanical relay contact or the soft-starting method only by the semiconductor switch.

In addition, since the small capacity and low-priced semiconductor is available, the price of the product can be reduced.

Furthermore, it is possible to select the starting mode of the direct starting mode or the soft starting mode, and since the arc current generated at the relay contact is consumed by the semiconductor switch, the durability of the motor can be extended.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A multi-functional hybrid contactor adoptable to a motor driving control system having a relay and a relay contact for driving and controlling an AC(Alternating Current) motor, the multi-functional hybrid contactor comprising:

a current detecting means for detecting each phase current supplied from an AC power source to an AC motor;

a starting mode selecting switch means for selectively starting the AC motor in a direct starting mode or in a soft starting mode;

a semiconductor switch means being connected in parallel to the relay contact, consuming an arc current due to a chattering of the relay contact by closing for a predetermined time after switching to the closed position of the relay contact if the selection switch means is selected in a direct starting mode, and soft-starting the AC motor by turning on and off for a predetermined time before the relay contact is closed, if the selection switch means is selected in a soft-starting mode;

a display means for displaying a running state of the AC motor and/or an abnormal state of an electric current supplied to the AC motor;

a setting means for setting a rated current, setting a delay time for neglecting an overcurrent during a predetermined time when the AC motor is directly started, and setting a starting time when the AC motor is soft-started;

a run/stop switch means for selectively running or stopping the AC motor; and a controller being connected to the current detecting means, the relay, the relay contact, the selection switch means, the semiconductor switch means, the display means, the run/stop switch means and the setting means, so as to control the relay, the semiconductor switch means and the display means depending on the run or stop selection of the run/stop switch means, the detect current from the current detecting means and the set mode of the selection switch means.

2. A multi-functional hybrid contactor comprising:

a detecting means for detecting each phase current supplied from an AC power source to an AC motor;

a relay contact being installed between the AC power source and the AC motor and being able to be switched to an opened position or a closed position to supply or cut off a power from the AC power source to the AC motor;

a relay for controlling switching of the relay contact;

a starting mode selection switch means for selectively starting the AC motor in a direct starting mode or a soft starting mode;

a semiconductor switch means being connected in parallel to the relay contact, consuming an arc current due to a chattering of the relay contact by closing for a predetermined time after switching to the closed position of the relay contact if the selection switch means is selected in a direct starting mode, and soft-starting the AC motor by turning on and off for a predetermined time before the relay contact is closed, if the selection switch means is selected in a soft-starting mode;

a display means for displaying a normal state or an abnormal state of the electric current supplied to the AC motor;

a display means for displaying a running state of the AC motor and/or an abnormal state of an AC current supplied to the AC motor;

a setting means for setting a rated current, setting a delay time for neglecting an overcurrent during a predetermined time when the AC motor is directly started, and setting a starting time when the AC motor is soft-started;

a run/stop switch means for selectively running and stopping the AC motor; and a controller being connected to the current detecting means, the relay, the relay contact, the selection switch means, the semiconductor switch means, the display means, the run/stop switch means and the setting means, so as to control the relay, the semiconductor switch means and the display means depending on the run or stop selection of the run/stop switch means, the detect current from the current detecting means and the set mode of the selection switch means.

3. The hybrid contactor of claim 1 or 2, further comprises a current and voltage measuring means for providing a detect current signal from the current detecting means and a voltage signal which has been converted to a voltage by operationally amplifying the detect current to the controller.

4. The hybrid contactor of claim 1 or 2, further comprises a voltage detecting means for detecting each phase voltage supplied from the AC power source to the AC motor.

5. The hybrid contactor of claim 1 or 2, wherein the semiconductor switch means is one of SCR(Silicon controlled rectifier), a GTO(Gate turn off) thyristor, an IGCT (Insulated gate controlled thyristor), a RCT(Reverse conducting thyristor), an IGBT(Insulated gate bipolar transistor).

6. The hybrid contactor of claim 1 or 2, wherein the phase of the current is two phases or a multi-phase of three phases or more.

7. The hybrid contactor of claim 1 or 2, wherein the abnormal state displayed by the display means represents the occurrence state of at least one of an over current, a phase inversion, a phase deficiency and an unbalance of phases in its occurrence, and the display means includes a means for displaying at least one of over current, phase inversion, phase deficiency and unbalance of phases.

8. The hybrid contactor of claim 1 or 2, wherein the setting means comprises a means for setting a phase order of each phase current in order to detect a phase inversion.

9. The hybrid contactor of claim 1 or 2, wherein the setting means includes a means for setting the number of each phase in order to detect a phase deficiency.

10. The hybrid contactor of claim 1 or 2, wherein the setting means includes a means for setting a tolerable difference rate of a root mean square value of each phase current in order to detect an unbalance of phases.

11. The hybrid contactor of claim 1 or 2, wherein the displaying means is one of a LCD(Liquid crystal display), a LED(Light emitting device) and a lamp.

12. The hybrid contactor of claim 1, further comprises a means for warning an abnormal state when the current supplied from the AC power source to the AC motor is abnormal.

13. The hybrid contactor of claim 12, wherein the warning means is a buzzer or a flickering lamp.

* * * * *